(12) United States Patent
Weissenborn

(10) Patent No.: US 6,575,510 B2
(45) Date of Patent: Jun. 10, 2003

(54) BUMPER SYSTEM WITH FACE-ABUTTING ENERGY ABSORBER

(75) Inventor: Mark Weissenborn, Grand Rapids, MI (US)

(73) Assignee: Shape Corporation, Grand Haven, MI (US)

( * ) Notice: Subject to any disclaimer, the term of this patent is extended or adjusted under 35 U.S.C. 154(b) by 0 days.

(21) Appl. No.: 09/967,196

(22) Filed: Sep. 28, 2001

(65) Prior Publication Data

US 2002/0149213 A1 Oct. 17, 2002

Related U.S. Application Data

(60) Provisional application No. 60/284,058, filed on Apr. 16, 2001.

(51) Int. Cl.[7] ............................................... B60R 19/03
(52) U.S. Cl. ....................................... 293/121; 293/120
(58) Field of Search ................................ 293/120, 121, 293/133

(56) References Cited

U.S. PATENT DOCUMENTS 4,998,761 A * 3/1991 Bayer et al.
5,290,078 A * 3/1994 Bayer et al.
6,082,792 A   7/2000 Evans et al.
6,179,353 B1  1/2001 Heatherington et al.
6,406,081 B1 * 6/2002 Mahfet et al.

* cited by examiner

Primary Examiner—D. Glenn Dayoan
Assistant Examiner—Scott Carpenter
(74) Attorney, Agent, or Firm—Price, Heneveld, Cooper, DeWitt & Litton

(57) ABSTRACT

A vehicle bumper system includes a bumper beam and a polymeric energy absorber positioned on a front of the bumper beam. The energy absorber has multiple box-shaped sections and also has interconnecting sections positioned along the length that interconnect adjacent ones of the box-shaped sections. The box-shaped sections of the energy absorber, when cross-sectioned by a transverse plane, include top and bottom U-shaped sections formed by top parallel legs and a top vertical leg and by bottom parallel legs and a bottom vertical leg, respectively. End walls close ends of the box-shaped sections and stabilize the top and bottom U-shaped sections. The interconnecting sections include a tying wall that connects the end walls together. By this arrangement, the box-shaped sections provide a stable and reliable energy absorbing mechanism.

10 Claims, 5 Drawing Sheets

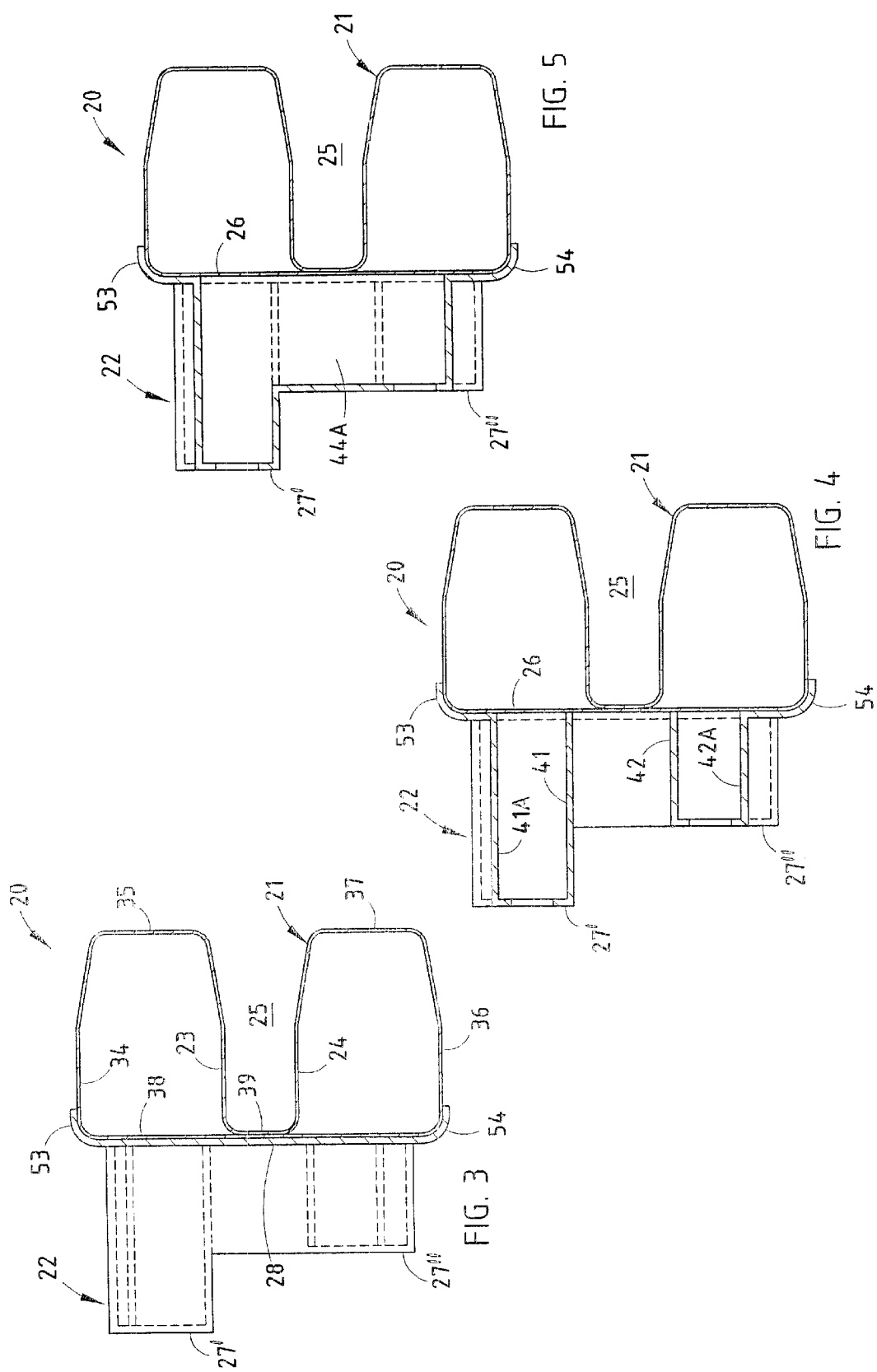

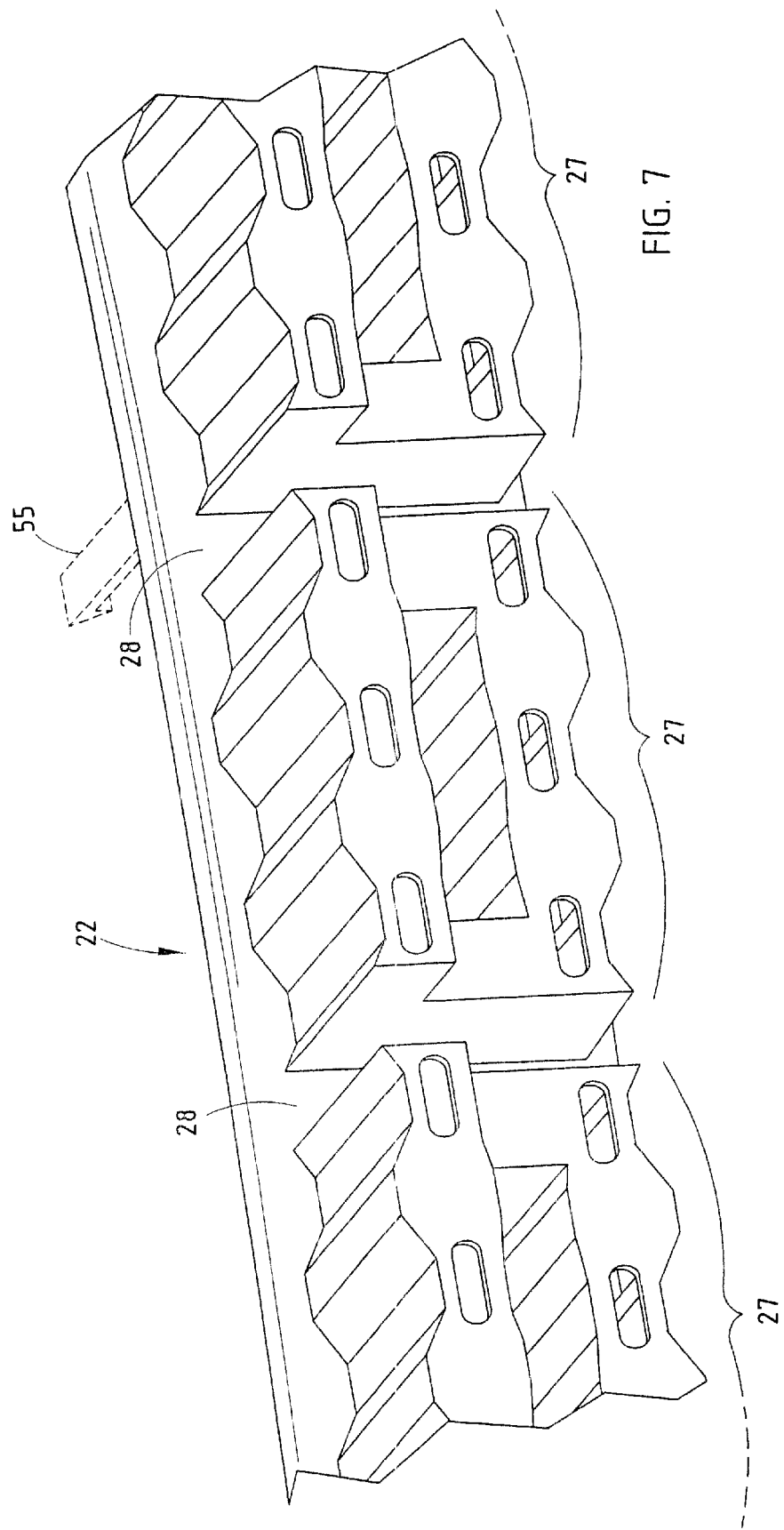

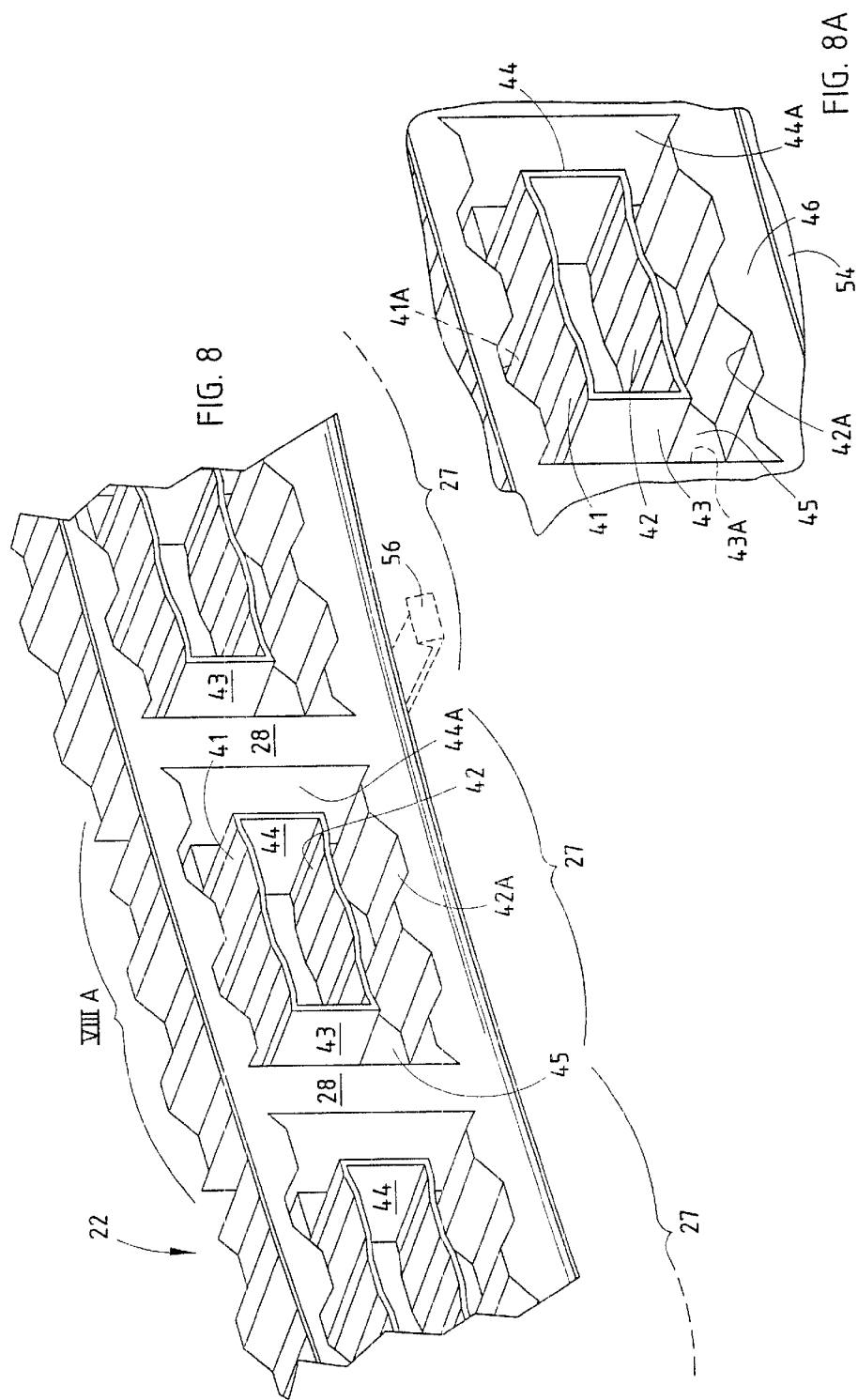

BUMPER SYSTEM WITH FACE-ABUTTING ENERGY ABSORBER

CROSS REFERENCE TO RELATED APPLICATION

This application claims benefit of provisional application serial No. 60/284,058, filed Apr. 16, 2001, entitled BUMPER SYSTEM WITH FACE-ABUTTING ENERGY ABSORBER under 35 USC 119.

BACKGROUND OF THE PRESENT INVENTION

The present invention relates to automotive bumper systems having beams and energy absorbers located on faces of the beams.

Many vehicle designs use energy absorbers positioned on a face or front surface of a steel bumper beam to improve energy absorption of a bumper system. The energy absorbers provide an initial level of energy absorption for low impact, including reducing damage during low impact, and also provide a supplemental level of energy absorption during high impact (i.e. before and-at the time that the beam and vehicle begin to absorb substantial amounts of energy). Usually, the energy absorbers are fastened to the bumper beam with fasteners that assure accurate positioning of the energy absorber on the beam. The reasoning includes accurately positioning the energy absorber on the bumper beam to assure consistent performance, as well as to assure accurate positioning for aesthetics and assembly (e.g. to assure a good fit of the front-end fascia over the energy absorber and beam during assembly).

However, improvements are desired in terms of temporary and permanent attachment, and for improved and more reliable energy absorption. Typically, attachment of the energy absorbers to bumper beams requires a plurality of fasteners. This is disadvantageous since fasteners require manual labor to install, which can add undesirably to cost. Also, the fasteners can result in localized and non-uniform stress distribution during impact, resulting in inconsistent collapse of the bumper system and poor energy absorption on impact. Further, fixing the energy absorber to the beams results in an inability of the energy absorber to shift and adjust to non-perpendicular and uneven loads transmitted from the impacting bodies. At the same time, depending on the bumper system, sometimes shifting of an energy absorber is not good since it can result in unpredictable, premature and non-uniform collapse, resulting in poor or inconsistent energy absorption by the bumper system.

For all of the above reasons, there is a desire for bumper systems that yield a better, more consistent, more reliable, and greater impact energy absorption, both for low and high impact events, and also for square and skewed impact directions. Also, there is a desire for improvements facilitating assembly of an energy absorber to a beam, with lower cost and fewer parts, and with less labor. Still further, there is a desire for energy absorber designs that allow adjustment and tuning for optimal front-end and corner impact strengths, even late in the bumper development program, and yet that does not require expensive or complex molding techniques or assembly techniques. Still further, there is a desire for energy absorber designs that are adaptable for use with many different bumper beam cross-sectional shapes and sizes. Also, energy absorber designs are desired that are flexible and usable on non-linear bumper beams having different curvatures and longitudinal sweeps, and having different cross sections.

SUMMARY OF THE PRESENT INVENTION

In one aspect of the present invention, a bumper system for vehicles includes a bumper beam having a continuous cross section with a front surface that extends vertically when the bumper beam is in a car-mounted position, and a polymeric energy absorber having a length. The energy absorber includes a rear surface abutting the front surface of the bumper beam. The energy absorber has multiple box-shaped sections and also has interconnecting sections positioned along the length that interconnect adjacent ones of the box-shaped sections. The box-shaped sections of the energy absorber, when cross-sectioned by a transverse plane that extends perpendicular to the length, include a top U-shaped section formed by top parallel legs and a top vertical leg, and further include a bottom U-shaped section formed by bottom parallel legs and a bottom vertical leg. The box-shaped sections further include end walls at each end that are attached to the parallel and vertical legs of the top and bottom U-shaped sections to close ends of the box-shaped sections and to stabilize the top and bottom U-shaped sections relative to each other. The interconnecting sections include a tying wall that connects the end walls together, whereby the box-shaped sections provide a stable and reliable energy absorbing mechanism with the energy-absorbing U-shaped sections being stabilized by the end walls and with adjacent box-shaped sections being held together by interconnecting sections.

In yet another aspect of the present invention, a bumper system for vehicles includes a bumper beam having a continuous cross section with a front surface that extends vertically when the bumper beam is in a car-mounted position. A polymeric energy absorber has a length and includes a rear surface abutting the front surface of the bumper beam. The energy absorber has first, second, third, and fourth parallel walls that extend horizontally, the first parallel wall being at a top location and the fourth parallel wall being at a bottom location. The energy absorber further includes a top front wall interconnecting the first and second parallel walls to form a rearwardly-facing U-shaped top channel, and includes a bottom front wall interconnecting the third and fourth parallel walls to form a rearwardly-facing U-shaped bottom channel, the energy absorber further having stabilizing walls that interconnect at least the first and fourth parallel walls to stabilize the top and bottom channels on the bumper beam.

In yet another aspect of the present invention, a bumper system for vehicles includes a bumper beam and an energy absorber for the bumper beam. The bumper beam has a front surface that extends vertically when the bumper beam is in a car-mounted position and has a pair of attachment features. The polymeric energy absorber has a length and includes a rear surface abutting the front surface of the bumper beam. The energy absorber further has a pair of protrusions adapted to engage the attachment features to temporarily loosely hold the energy absorber on the bumper beam during assembly of the energy absorber to the bumper beam.

In a narrower aspect, the protrusions include a hooked end, and are integrally molded as contiguous material of the energy absorber. Also, the protrusions extend from an upper portion of the energy absorber and hook onto a feature on a top of the bumper beam.

These and other aspects, objects, and features of the present invention will be understood and appreciated by those skilled in the art upon studying the following specification, claims, and appended drawings.

BRIEF DESCRIPTION OF DRAWINGS

FIGS. 3–6 are cross-sectional views of the energy absorber taken along the lines III—III, IV—IV, V—V, and VI—VI in FIG. 2; and FIGS. 7 and 8 are front and rear perspective views of the energy absorber shown in FIG. 2, and FIG. 8A is a fragmentary perspective view of a portion of FIG. 8.

DETAILED DESCRIPTION OF PREFERRED EMBODIMENTS

The present invention is described as utilizing a B-shaped double-tube bumper beam that is rollformed and swept. The present B-shaped bumper beam is sufficiently described herein for a person skilled in the art to understand and practice the present invention, but it is noted that the process and method of making the illustrated B-shaped bumper beam is described in greater detail in Sturrus patent U.S. Pat. No. 5,454,504, if the reader desires such information. It is specifically contemplated that the present invention could be used in combination with a bumper beam having a shallower channel instead of the deep channel illustrated. For example, the present invention would work on a D-shaped bumper where the bumper beam had a vertically-extending surface extending across a significant vertical portion of a front face of the bumper beam but does not extend completely across a vertical front face of the bumper beam. On the merits, the teachings of U.S. Pat. No. 5,454,504 are incorporated herein in its entirety for the purpose of providing a complete disclosure of the entire bumper system.

Figure 1:
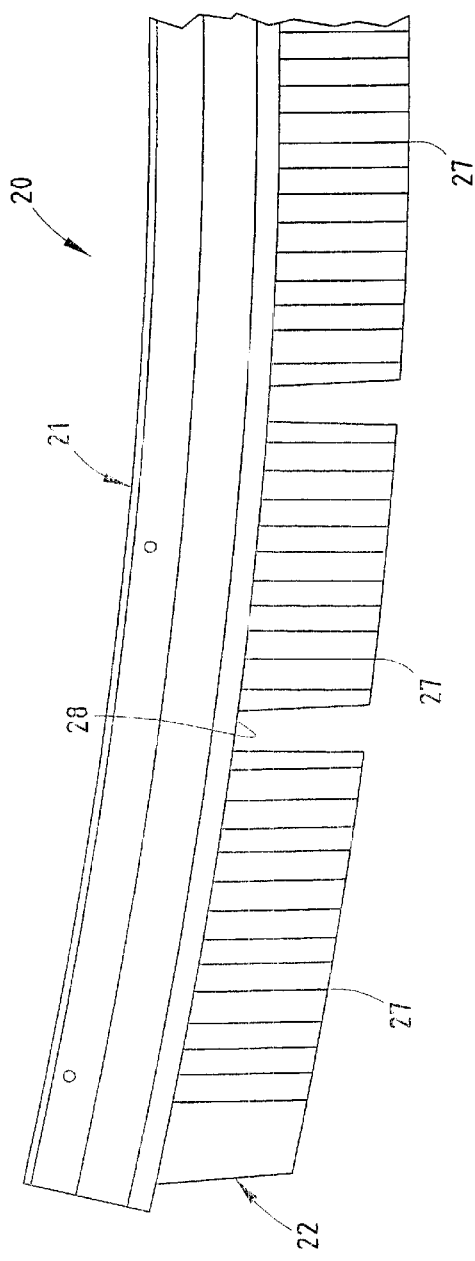
FIGS. 1 and 2 are fragmentary perspective views of a bumper system of the present invention, including a bumper beam and an energy absorber.
Figure 2:
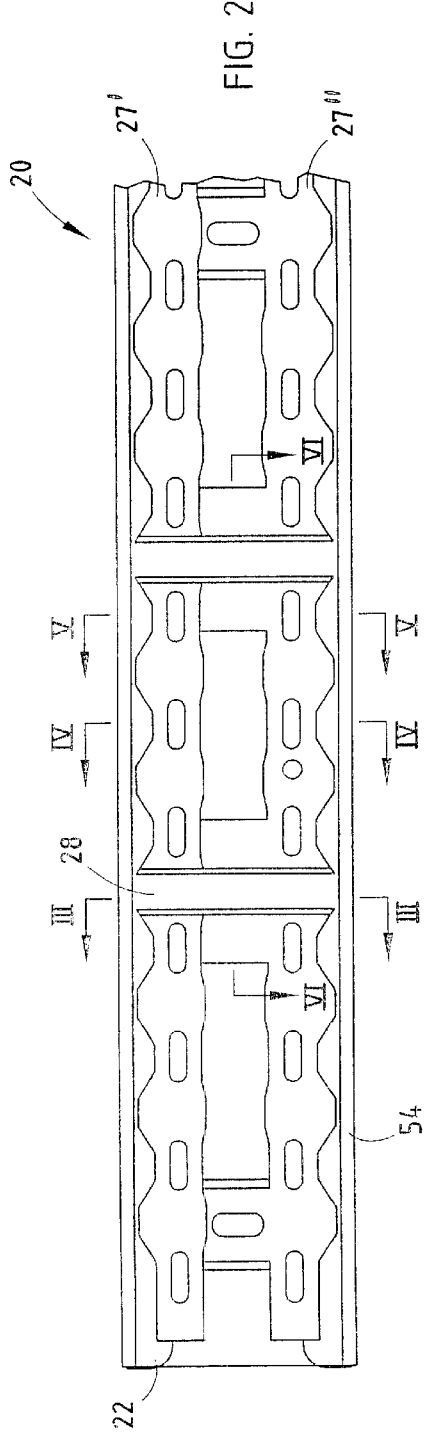
Figure 6:
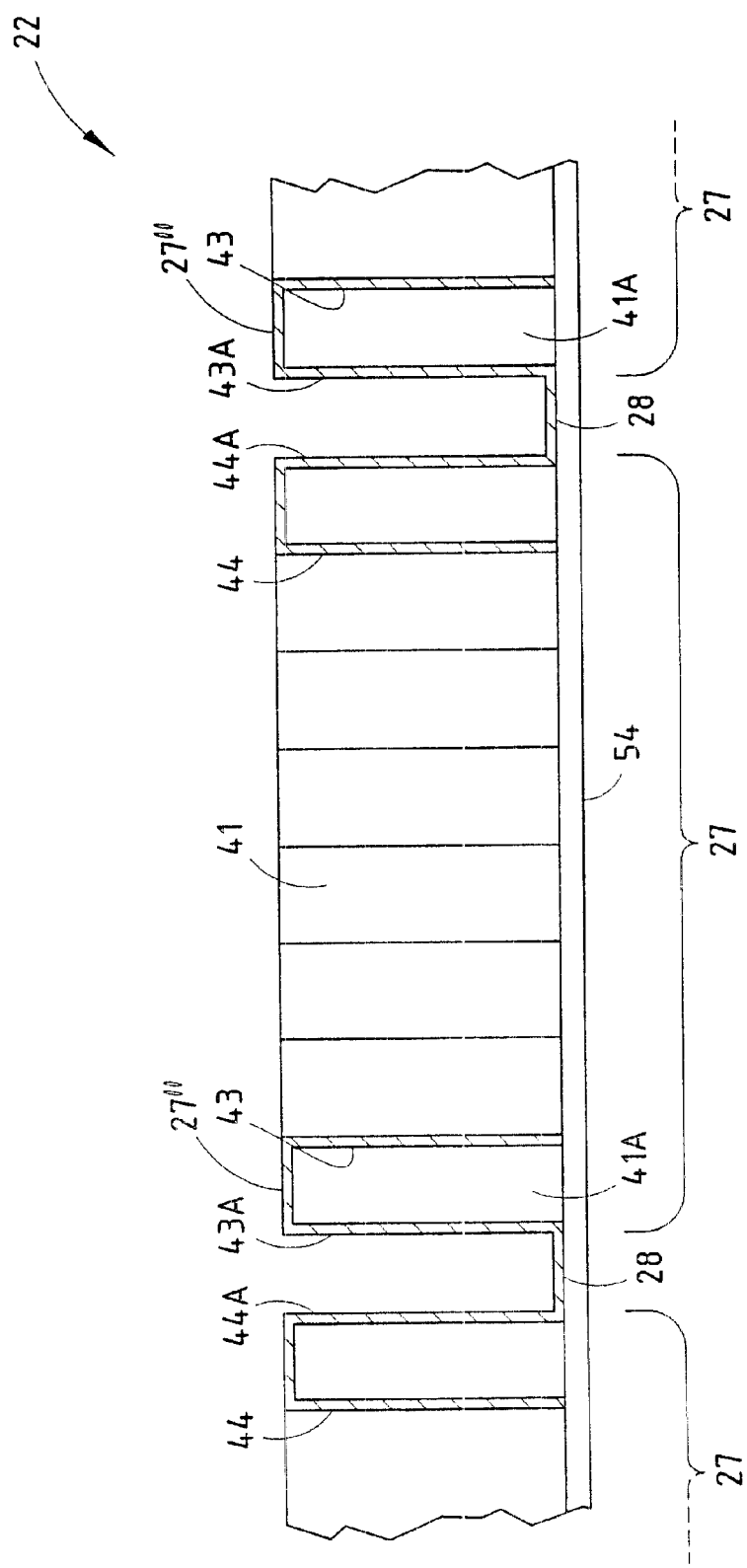

In regard to the illustrated preferred embodiment, a bumper system 20 (FIGS. 1–6) for vehicles includes a bumper beam 21 and an energy absorber 22 attached to a face of the bumper beam 21. The illustrated beam is rollformed and swept (see Sturrus patent U.S. Pat. No. 5,454,504) and has a continuous B-shaped double-tubular cross section (FIG. 2). The double tubes are spaced vertically apart and include top and bottom mid-walls 23 and 24 defining a longitudinally-extending channel 25 along its rear surface. A polymeric energy absorber 22 has a length with multiple box-shaped sections 27 (five box-shaped sections are shown, but not all are the same length) that abut the front surface 26 of the bumper beam 21. The energy absorber 22 further includes a plurality of tying sections 28 that extend longitudinally between the box-shaped sections 27 and also vertically between top and bottom portions 27' and 27" of the box-shaped sections 27, as discussed below.

The B-shaped section of the bumper beam 21 (FIG. 3) includes, in addition to top and bottom mid-walls 23 and 24, a top wall 34, a rear upper wall 35, a bottom wall 36, a rear lower wall 37, a primary front wall 38 and a channel-forming overlapping front wall 39. The top tube of the bumper beam 21 is formed by the walls 23, 34, 35, and 38. The bottom tube of the bumper beam 21 is formed by the walls 24, 36, 37, and 38. The top and bottom tubes are interconnected by front walls 38 and 39. Each of these walls 23–24 and 34–39 can be flat or non-flat. For example, in some bumper systems (such as the illustrated bumper beam), it has been found to be beneficial to make the horizontal walls 23, 24, 34, and 36 slightly bent or curved (in a front-to-rear direction), both for purposes of providing a bumper beam that is less likely to prematurely kink and more likely to reliably and consistently bend, but also for the purpose of ease of manufacture of the bumper beam. As illustrated, the mid-walls 23 and 24 include rear portions that are angled to created a tapered throat.

The energy absorber 22 is a molded component of non-foam polymer, such as a blend of PC/ABS/TPE. For example, it is contemplated that General Electric's XENOY polymer will work for this purpose. The energy absorber 22 includes five box-shaped sections 27 that abut a front of the front wall 38. Tying walls 28 hold the box-shaped sections 27 together. The illustrated box-shaped sections 27 (FIG. 8A) each include a top wall 41, a bottom wall 42, and opposing sidewalls 43 and 44. A front wall 45 extends around walls 41–44 and forms a perimeter flange around them. Additionally, the box-shaped sections 27 include a top wall 41A, a bottom wall 42A, and opposing end walls 43A and 44A that extend from the outer edges of front wall 45 and extend parallel the walls 41–44, respectively. A rear wall 46 extends outwardly from the walls 41A–44A forming a perimeter. The section 28 is that part of wall 46 that interconnects and ties adjacent box-like sections 27 together. All walls of sections 27 (and wall 28) are about 1.5 to 3.5 mm thick, or more preferably about 2.0 mm to 2.5 mm thick. It is noted that the top and bottom walls 41, 41A, 42, 42A, when viewed from a position in front of the bumper system, can be wavy and undulating or otherwise non-linear and non-flat in shape. The other walls can also be wavy or undulating. This provides the walls with increased strength for resisting buckling, and also helps eliminate distortions, such as snaking, that occur when molding a long part. It is also noted that the walls 41, 41A, 42, and 42A extend longitudinally on the bumper beam 21, but are discontinuous and further include non-blind surfaces to prevent die lock when molding. (i.e. This allows mold tooling to pass through the plane of one wall to form another wall.) In other words, the energy absorber 22 can be made by using male and female molds, neither of which require secondary or movable die components for forming the energy absorber 22.

The box-shaped sections 27 of the illustrated energy absorber 22 are able to absorb significant energy without failure, such as may be incurred in a low energy impact. Thus, in a low energy impact, the energy absorber 22 absorbs the impact energy, and the bumper beam 21 does not permanently or temporarily deform. In an intermediate energy impact, the bumper beam 21 and the energy absorber 22 do deflect and absorb energy, but do not permanently deform. However, the walls 23–24 and 34–39 of the energy absorber 22 may permanently deform. In a high energy impact, both the energy absorber 22 and the bumper beam 21 initially absorb energy and then buckle as they approach a maximum amount of deflection. The point of buckling is designed into the bumper system 20 to cause a maximum amount of energy to be absorbed without damaging the vehicle, while considering all relevant factors such as occupant safety, government standards, and the like.

A top lip 53 extends rearwardly from the top of wall 46 of the box section 27, and a bottom lip 54 extends rearwardly from the bottom of wall 46 of the box section 27. The lips 53 and 54 engage top and bottom surfaces on the bumper beam 21. Optionally, the lips 53 and 54 can include attachment tabs or hooks (see hook tab 55 in FIG. 7 and hook tab 56 in FIG. 8) for engaging apertures or features in the bumper beam 21 for retaining (temporarily or permanently) to the bumper beam 21. These lips 53 and 54 are advantageous in that all (or most) fasteners can be eliminated for attaching the energy absorber 22 to the bumper beam 21. It is contemplated that the vehicle front fascia 57 (FIG. 5) can be used to hold the energy absorber 22 on the bumper beam 21 without any fasteners, if desired, as noted below.

It is noted that the present arrangement faces a "flat side" of the B-shaped cross section of the bumper beam 21 toward the energy absorber 22, although it is contemplated that the present inventive energy absorber 22 can be positioned against the lobed part of the B-shaped bumper beam 21 and function satisfactorily. In such case, the B-shaped bumper beam 21 would be swept with its "flat" face on the vehicle side of the bumper beam and facing rearwardly.

In the present bumper system, the energy absorber 22 is relatively loosely supported on the bumper beam 21. This is unusual in that historically, automobile manufacturers want the position of the energy absorbers closely controlled and well-fastened to the bumper beam. However, testing has shown that a relatively loose energy absorber can, if properly designed, actually assist in preventing premature collapse of the energy absorber by allowing the energy absorber to adjust to the impacting object to better "face" the impacting object as the impact collision occurs.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. In a unitary elongated energy absorber adapted for attachment to a vehicle, where said energy absorber includes a flanged frame for attachment to said vehicle and a body extending from said frame, said body including at least one first transverse wall, at least one second transverse wall spaced vertically from said first wall and a plurality of tunable crush boxes extending therebetween, said crush boxes being spaced apart along a longitudinal axis of said body to form open cavities therebetween and including front walls that combine to define a plane; an improvement comprising:

a plurality of tying walls, each one of the tying walls interconnecting one of the tunable crush boxes to an adjacent one of the tunable crush boxes, each one of the plurality of tying walls including a forward-facing surface that is open and unobstructed in a first linear direction perpendicular to a front of the energy absorber, and further including a rearward-facing surface that is open and unobstructed in a second linear direction perpendicular to a rear of the energy absorber, whereby the tying walls can be easily and integrally formed when molding the energy absorber by passing a portion of mold tooling through the plane defined by the front walls of the crush boxes linearly into the open cavities to form the tying walls.

2. The energy absorber defined in claim 1, wherein said tying walls are each flat and extend vertically and longitudinally.

3. The energy absorber defined in claim 1 wherein said plurality of tying walls are coplanar.

4. The energy absorber defined in claim 1 wherein said crush boxes each have a front and a rear, and said tying walls are located at said rear.

5. The energy absorber defined in claim 1 wherein said crush boxes include sidewalls, and wherein said tying walls interconnect a rear of adjacent ones of said sidewalls.

6. In a unitary elongated energy absorber adapted for attachment to a vehicle, where said energy absorber includes a flanged frame for attachment to said vehicle and a body extending from said frame, said body including at least one first transverse wall, at least one second transverse wall spaced vertically from said first wall and a plurality of tunable crush boxes extending therebetween, said crush boxes being spaced apart along a longitudinal axis of said body to form open cavities therebetween and including front walls that combine to define a plane; an improvement comprising:

a plurality of tying walls, each tying wall interconnecting at least one of the first transverse walls to one of the second transverse walls, each one of the plurality of tying walls including a forward-facing surface that is open and unobstructed in a first linear direction perpendicular to a front of the energy absorber, and further including a rearward-facing surface that is open and unobstructed in a second linear direction perpendicular to a rear of the energy absorber, whereby the tying walls can be easily and integrally formed when molding the energy absorber by passing a portion of mold tooling through the plane defined by the front walls of the crush boxes linearly into the open cavities to form the tying walls.

7. The energy absorber defined in claim 6, wherein said tying walls are each flat and extend vertically and longitudinally.

8. The energy absorber defined in claim 6 wherein said plurality of tying walls are coplanar.

9. The energy absorber defined in claim 6 wherein said crush boxes each have a front and a rear, and said tying walls are located at said rear.

10. The energy absorber defined in claim 6 wherein said crush boxes include sidewalls, and wherein said tying walls interconnect a rear of adjacent ones of said sidewalls.

* * * * *